Figure 1:
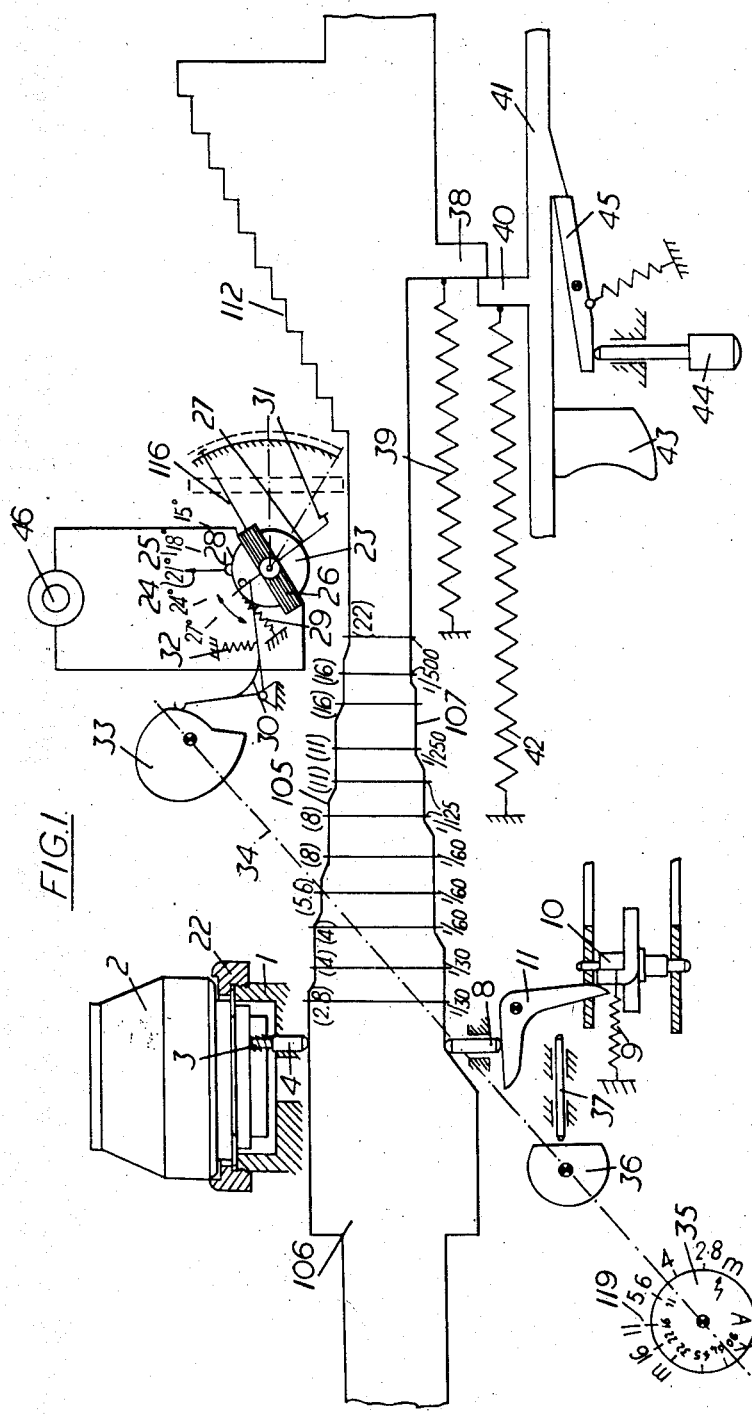

Jan. 8, 1963  W. HAHN ET AL  3,072,033
PHOTOGRAPHIC CAMERAS
Filed July 17, 1961  3 Sheets-Sheet 1

Inventors
WERNER HAHN
ROLF NOACK
By Irwin J. Thompson
Attorney

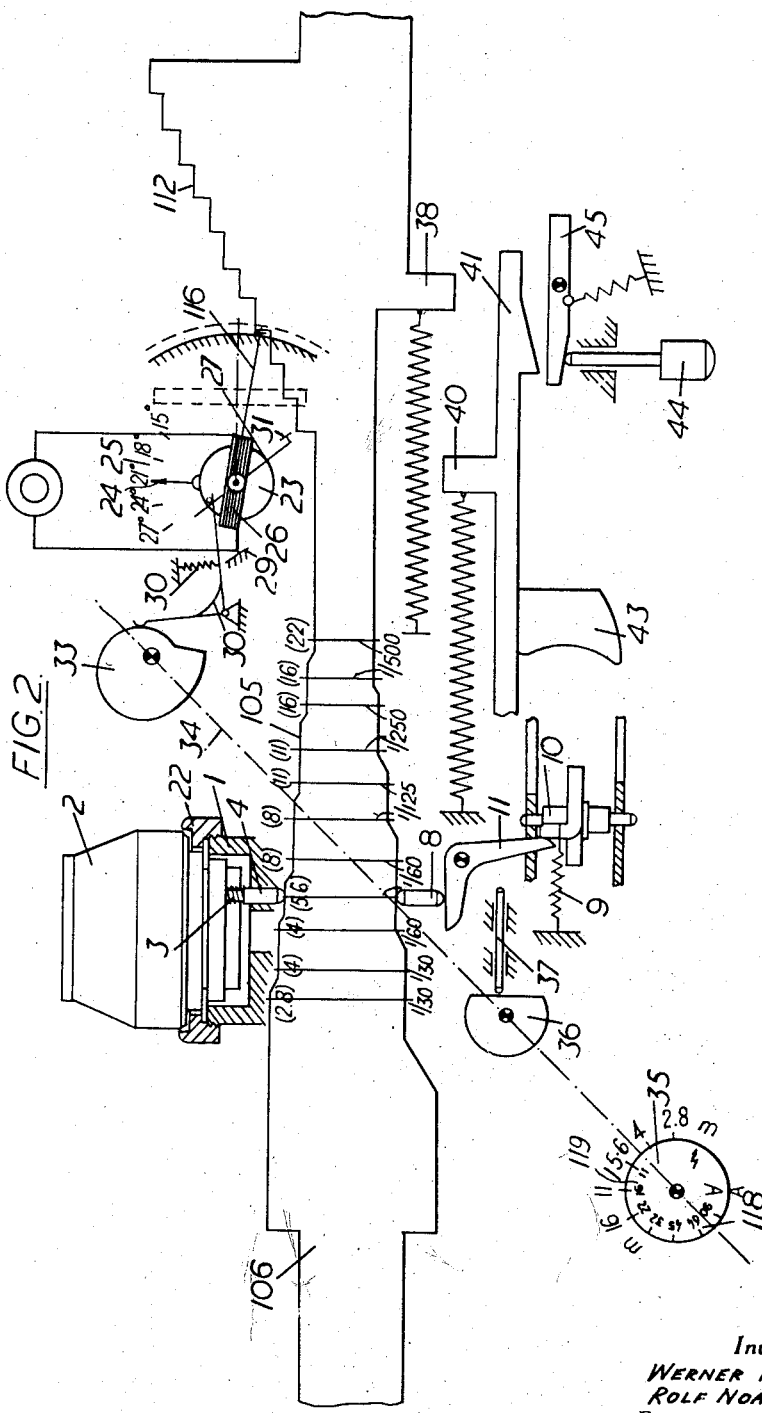

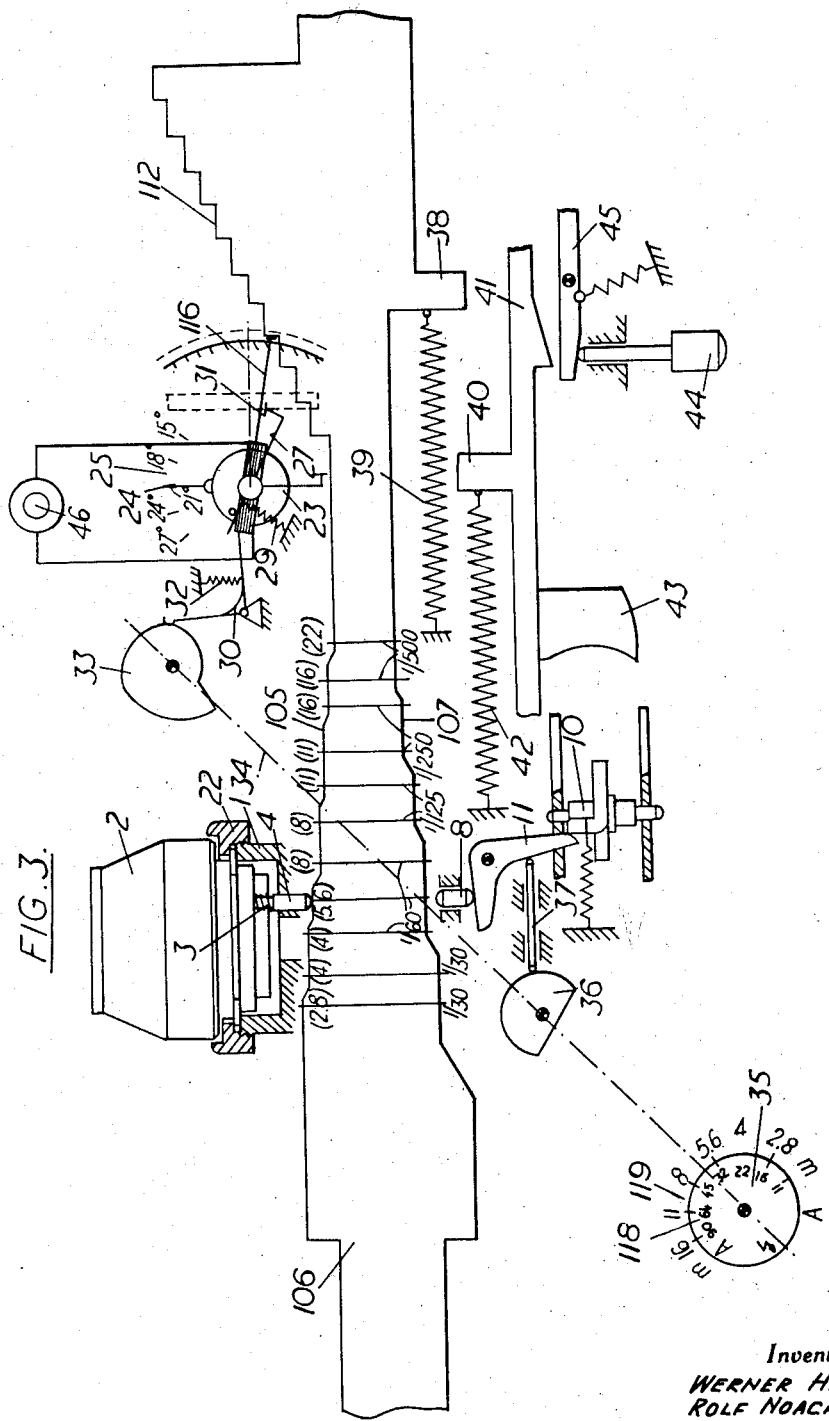

# 3,072,033
PHOTOGRAPHIC CAMERAS
Werner Hahn and Rolf Noack, Dresden, Germany, assignors to VEB Kamera- und Kinowerke Dresden, Dresden, Germany
Filed July 17, 1961, Ser. No. 124,606
3 Claims. (Cl. 95—10)

The present invention relates to a photographic camera having an objective lens which may be interchangeable with another, the built-in diaphragm of which is set or preselected by a setting ring on the camera or shutter side, an example of which is described in the specification of United States patent application No. 37,122, now Patent No. 3,037,434.

The pre-set control arrangement as set forth in the earlier patent application is operable by hand, the known special manual operations for the setting and bringing into alignment of a follow-up pointer with the galvanometer pointer being necessary before each exposure. Furthermore such additional setting movements are also necessary in the case of each exposure by means of artificial light.

The aim of the invention is the improvement of the device of the parent application along the lines of an automatic setting of the exposure factors "diaphragm" and "exposure time" both in the case of daylight and in the case of artificial light exposures.

This is achieved in accordance with the invention due to the fact that the follow-up member is constructed as stop cam and with the setting ring there is associated a setting spring drawing the stop cam against the instrument pointer, while a change-over switch for daylight to artificial light exposures blocks the exposure time setting member through a cam and through a control cam prevents the instrument pointer from moving in a predetermined range of aperture values, said range increasing from the smallest value. The change-over switch preferably carries a scale which is arranged opposite a scale fast with the housing, the one scale possessing values for the distance of the object and the other scale possessing light guide numbers. In order to be able to cock the setting ring together with the shutter mechanism and possibly the film winding, the setting ring has a cam which lies in the path of a drive member arranged on a shutter-cocking ring of known construction. The details of the invention may be seen from an illustrated and described example of embodiment.

FIGURE 1 shows the device in the cocked state in the case of setting for daylight exposures, FIGURE 2 shows the device in the working position and FIGURE 3 shows the device in the working position in the case of the carrying out of artificial light exposures.

By means of the bayonet ring 22 the camera housing 1 carries on its front the interchangeable objective lens 2, which possess a built-in diaphragm. A spring 3 (see FIGURE 3) seeks to draw the diaphragm into its minimum aperture and to press the plunger 4 against the control cam 105 of the setting ring 106. The setting ring 106 possesses a further control cam 107. As a result of the spring 9 the plunger 8 places itself against this control cam 107, the spring 9 being secured to the exposure time mechanism 10 and a bell-crank lever 11 being arranged between the said exposure time mechanism 10 and the plunger 8.

In the path of a further control cam 112 of the setting ring 106 there swings the pointer 116 of the galvanometer 23. The galvanometer 23 is rotatable and settable by means of a pointer 24 in relation to a film-sensitivity scale 25. Concentrically with the moving coil 26 there is mounted a lever 27 possessing a blocking nose 31, the pin 28 of which is drawn by a spring 29 against the double lever 30. As a result of a more powerful spring 32 this double lever 30 rests on the control cam 33, which is secured on the indicated shaft 34. With this shaft 34 there is connected a change-over switch 35. The change-over switch 35 is provided with the flash guide number scale 118, opposite which a distance auxiliary scale 119 is arranged firmly on the housing. Two marks "A" indicate the position of the change-over switch in which automatic setting of the exposure factors is selected in the case of daylight exposures.

On the shaft 34 there is further mounted a cam 36, which co-operates with a plunger 37. This plunger 37 lies in the path of the bell-crank lever 11 of the exposure time setting mechanism 10.

On a lug 38 of the setting ring 106 there is secured one end of a setting spring 39 anchored in the housing 1. In the path of this lug 38 there lies a drive member 40 of the cocking ring 41 of a known shutter, on which there is secured one end of a drive spring 42. A handle 43 serves for the cocking and a catch lever 45 pivotable by a release 44 serves for blocking the cocking ring 41 in the cocked position.

The manner of operation of the device is as follows:

By tightening of the bayonet ring 22 the objective lens 2 desired in each case is firmly connected with the camera 1. Here the diaphragm aperture corresponding to the momentary position of the setting ring 106 is automatically set by impression of the plunger 4 against the spring 3.

If daylight exposures are to be effected, the change-over switch 35 is rotated until the two marks "A" coincide. In this rotation, as a result of the control cam 33 and the double lever 30, the lever 27 has pivoted with its stop 31 out of the pivoting range of the pointer 116 (see FIGURE 1). Furthermore through the cam 36 the bell-crank lever 11 and thus the exposure time mechanism on the shutter side are released.

On grasping of the handle 43 and rotation to the right the drive spring 42 is tensioned. At the same time the drive member 40 takes the lug 38 of the setting ring 106 and rotates it also to the right, the setting spring 39 also being tensioned. In the cocked position the catch lever 45 holds the cocking ring 41 and, through the drive member 40, the setting ring 106.

When the objective lens 2 is directed towards the object to be photographed, the moving coil 26 with the pointer 116 experiences a deflection corresponding to the brightness impinging on the photo-electric cell 46 (see FIGURE 2). On depression of the release 44 the catch lever 45 is pivoted and the cocking ring 41 is released. At the same time the setting ring 106 runs with its control cam 112 against the pointer 116. Here the spring-loaded plungers 4 of the diaphragm and 8 of the exposure time mechanism follow the cams 105 and 107, whereby diaphragm and exposure time are set.

In the case of flash exposures (see FIGURE 3) by rotation of the change-over switch 35 by means of the distance auxiliary scale 118 the value of the distance between flash lamp and object to be photographed is placed opposite the flash guide number of the flash lamp used on the flash guide number scale 119. Here through the cam 36 and the plunger 37 the exposure time mechanism is locked in a position suitable for flash exposures (for example 1/30 sec.) and through the control cam 33 and the double lever 30 the lever 27 with the blocking nose 31 is pivoted into the path of the pointer 116. Here the pointer 116 is entrained to a value corresponding to medium diaphragm aperture. On depression of the release the locked exposure time is maintained, while only the diaphragm is set through the plunger 4.

We claim:

1. In a photographic camera having an objective lens, a built-in diaphragm, a setting ring on the camera for setting said diaphragm, a galvanometer having a pointer, and an exposure time setting member, the provision of a follow-up member in the form of a stop cam, a setting spring associated with the setting ring and which pulls the stop cam towards the instrument pointer, a change-over switch for daylight and artificial light exposures, a cam actuated by the switch and serving to block the exposure time setting member, a control cam also actuated by said change-over switch, and means movable by said control cam into the path of the instrument pointer to prevent movement of the latter over a predetermined range of aperture values, said range increasing from the smallest value.

2. A photographic camera according to claim 1, wherein the change-over switch carries a scale, opposite to which there is arranged a scale fast with the camera housing, the one scale possessing values for the object distance and the other scale possessing flash guide numbers.

3. A photographic camera according to claim 1 wherein the setting ring possesses a drive member cam which lies in the path of a drive member arranged on a shutter cocking ring.

References Cited in the file of this patent
UNITED STATES PATENTS

| | | |
|---|---|---|
| 2,917,983 | Gebele | Dec. 22, 1959 |
| 2,953,978 | Rentschler | Sept. 27, 1960 |
| 2,993,422 | Rentschler | July 25, 1961 |